No. 892,379. PATENTED JUNE 30, 1908.
R. H. MILLER.
GLASS FURNACE.
APPLICATION FILED JULY 3, 1905
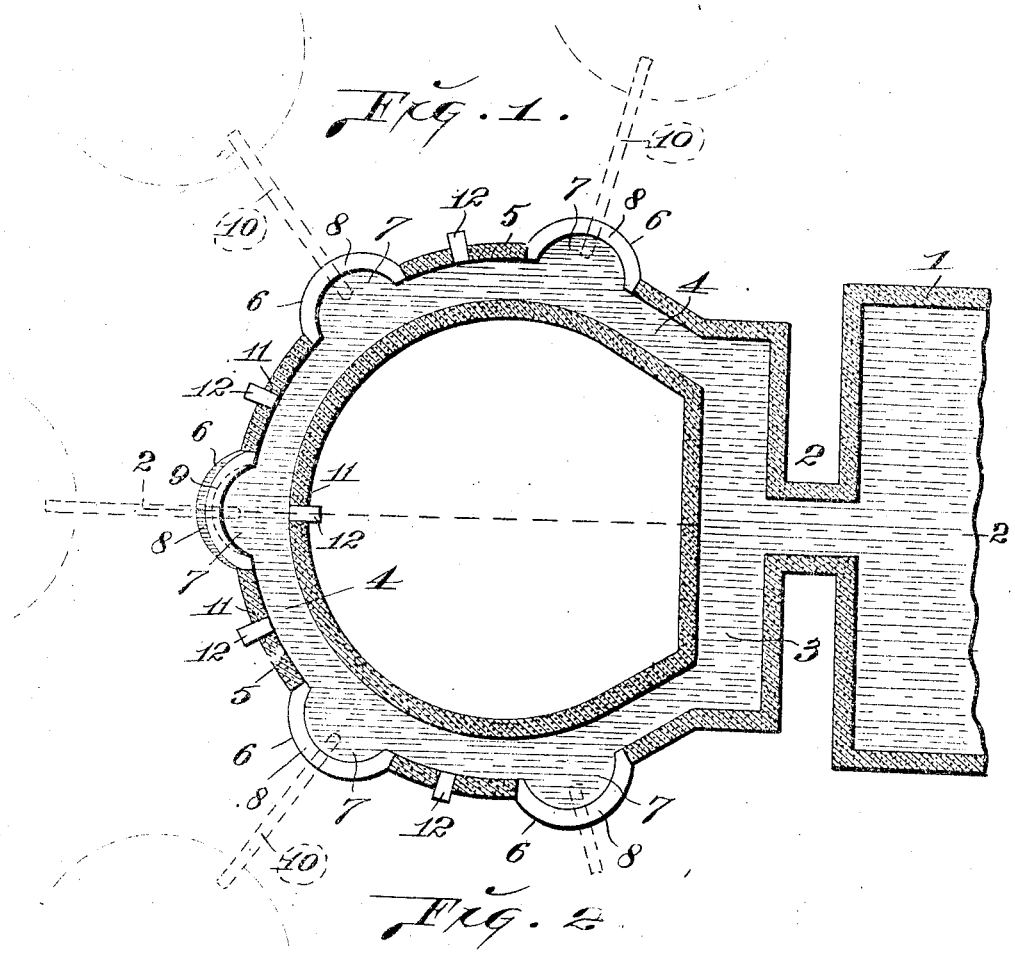
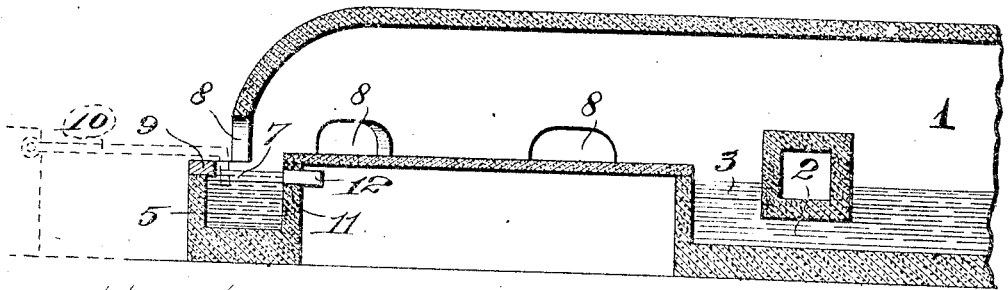
Attest,
M. P. Smith
H. J. Fletcher
Inventor:
Robert H. Miller.
By Higdon & Longan
Attys.

UNITED STATES PATENT OFFICE.

ROBERT H. MILLER, OF ST. LOUIS, MISSOURI, ASSIGNOR TO CHRISTY FIRE CLAY CO., OF ST. LOUIS, MISSOURI.

GLASS-FURNACE.

No. 892,379.　　　　Specification of Letters Patent.　　　　Patented June 30, 1908.

Application filed July 3, 1905. Serial No. 268,253.

*To all whom it may concern:*

Be it known that I, ROBERT H. MILLER, a citizen of the United States, and resident of St. Louis, Missouri, have invented certain new and useful Improvements in Glass-Furnaces, of which the following is a specification containing a full, clear, and exact description, reference being had to the accompanying drawings, forming a part hereof.

My invention relates to an improved glass furnace, the principal object of my invention being to construct a glass furnace that will accommodate, and deliver glass to, a plurality of glass blowing machines.

A further object of my invention is to construct a glass furnace, wherein the flow of molten glass from the primary heating and melting chamber is automatically controlled and regulated by the removal of small quantities of the molten glass by the arms and other devices that deliver the said small quantities of glass, to the glass blowing machines.

My invention consists in a duct or passage way, preferably circular in form, and provided with a series of pockets, in which are formed openings, through which the arms of the glass machines travel, in order to gather and carry quantities of the molten glass from the pockets of the duct to the glass blowing machines. This constant dipping in and carrying away of the molten glass necessarily causes a corresponding movement or flow of the molten glass through the duct from the primary heating and melting furnace.

My invention further consists in certain novel features of construction and arrangement of parts that will be hereinafter shown, described, and claimed.

Figure 1 is a horizontal section taken through the duct of my improved glass furnace. Fig. 2 is a vertical section taken longitudinally on line 2—2 of Fig. 1.

Referring by numerals to the accompanying drawings, 1 indicates the main furnace in which the glass is melted and from which it flows through an outlet 2 into the elongated chamber or settling basin 3. Leading from the ends of this chamber 3 is a duct 4, preferably circular in plan view, although it may be in the shape of a horse-shoe or of any other convenient form. This duct is preferably of uniform width and depth throughout its length although it may be varied in width and depth at different points to suit different conditions. In the outer wall 5 of this duct is formed a series of outwardly extending projections 6, preferably semi-circular, and which form a corresponding series of pockets 7 in the duct 4. These pockets 7 are necessarily arranged at proper distances apart, in order to accommodate the glass blowing machines that are arranged around the duct. (See dotted lines Fig. 1.) Formed in the outer wall of each of the pockets is a horizontally arranged opening 8 through which the outer end of the arm travels that conveys the proper quantity of molten glass to the glass blowing machine. If desired, a plate such as 9 may be located upon top of the outer wall of the duct below each opening 8, in order to prevent cold air from coming in contact with the surface of the molten glass within the pockets. These plates may be made adjustable if desired.

In the practical use of my improved furnace the glass blowing machines are arranged around the duct, at proper distances in front of the pockets, so that the outer ends of the arms such as 10 will travel through the openings 8 and dip into the pockets 7. The molten glass from the primary furnace 1 will pass through the outlet 2 into the chamber 3 and from thence will flow through the duct 4 and consequently into the pockets 7. When the devices for feeding the glass blowing machines are set in motion the outer ends of the arms in their travel will pass into the pockets 7 and each will carry a proper quantity of molten glass from said pocket to the blow-molds of the blowing machine, and this constant removal of small quantities of molten glass will necessarily induce a flow of the molten glass through the duct 4 from the chamber 3 and consequently from the primary heating furnace 1. Thus a constant supply of molten glass is maintained in the duct 4 and pockets 7 in a purely automatic and natural manner, and no mechanical devices whatever are required to deliver the molten glass to the ends of the arms 10. If desired, openings 11 may be formed in the duct at suitable points in the front end thereof, which openings are normally closed by plugs 12, and when these plugs are removed the molten glass will discharge through said openings 11 and thus induce a flow of molten glass through the duct and all parts thereof. The over-flow from the openings 11 may be conducted back to the primary furnace 1 in any manner desired.

As stated before, the duct may vary in width and depth at various points in order to accomplish the desired result in a thoroughly practical manner, and said duct can be built in any size and in suitable form, it only being essential that the outer wall of said duct be provided with the openings through which the devices travel that carry the proper quantities of molten glass to the glass blowing machines. In this manner I am enabled to accommodate a number of glass blowing machines and to properly feed or deliver molten glass to said machines.

I claim:

1. The combination with a glass melting chamber having an outlet, of a settling basin into which the outlet discharges, a continuous covered duct leading from the ends of the settling basin, and there being a plurality of openings into said duct through which the molten glass is removed from the duct.

2. The combination with a chamber of a glass furnace, and the outlet therefrom, of a settling basin into which the molten glass discharges from the outlet, a continuous covered duct connected at its ends to the settling basin, pockets formed in the outer wall of the duct, and there being openings through the cover of the duct into said pockets.

3. The combination with the melting chamber of a glass furnace, of a continuous covered duct leading from the outlet of the melting chamber, there being pockets formed in said duct, and there being openings through the cover of the duct into said pockets.

In testimony whereof, I have signed my name to this specification, in presence of two subscribing witnesses.

ROBERT H. MILLER.

Witnesses:
  M. P. SMITH,
  E. M. HARRINGTON.